July 3, 1956 L. MICHELS 2,753,453
LOW FREQUENCY NOISE GENERATOR
Filed March 8, 1954
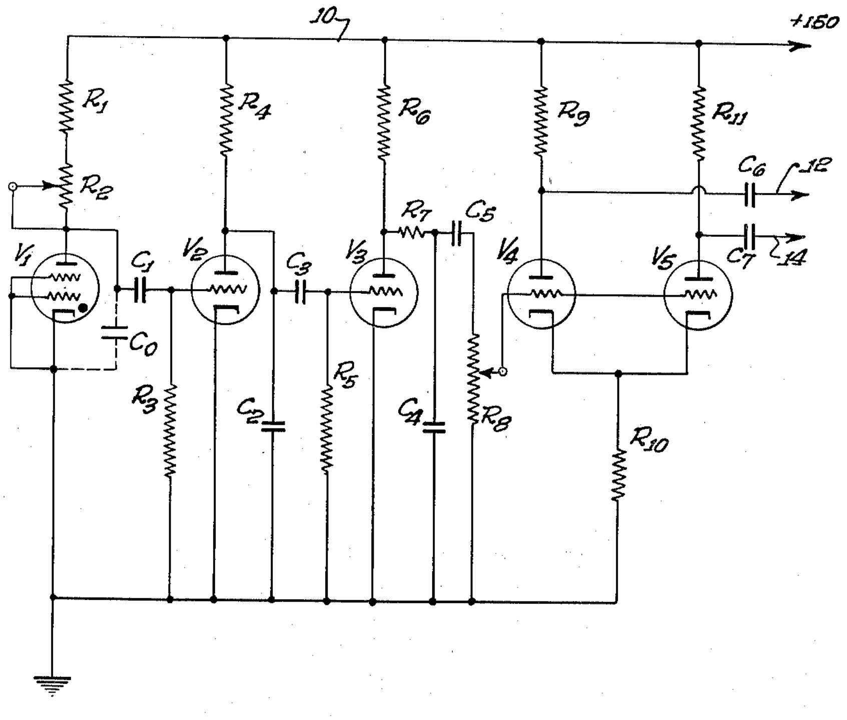
LAWRENCE MICHELS,
INVENTOR.
BY Beckelew & Scattlebury
ATTORNEYS.

United States Patent Office 2,753,453

Patented July 3, 1956

2,753,453

LOW FREQUENCY NOISE GENERATOR

Lawrence Michels, Los Angeles, Calif., assignor to Gilfillan Bros., Inc., Los Angeles, Calif., a corporation of California Application March 8, 1954, Serial No. 414,609

5 Claims. (Cl. 250—36)

This invention has to do with means for generating an electrical signal that embraces a continuous band of frequencies of appreciable bandwidth, the amplitude at each frequency varying with time in a substantially random manner. That type of signal is commonly referred to as a "noise signal," by analogy with the random variations that normally occur inherently in any circuit and that often produce audible noise in acoustical systems. The present invention, however, is primarily concerned with producing noise of relatively low frequency, typically well below the frequency range of normal acoustics.

Noise generating systems have been described that utilize as an initial noise signal the current or charge fluctuations that are produced directly by random movements of the elementary charges that move in a circuit. Such random movements of elementary charges are particularly noticeable in the thermal emission of electrons in electronic tubes and are commonly referred to as "thermal noise." Such noise signals can be amplified, and the desired band of frequencies can be isolated from the resulting signal by means of filter networks of various types. However, noise generators of that type are not satisfactory for the present purpose. Thermal noise for frequencies less than $6\times10^{12}$ cycles per second tends to be proportional to the square root of the system bandwidth and independent of the frequency region of the system. The present invention is particularly concerned with a relatively restricted frequency range, typified by a bandwidth of about 100 cycles per second, within which the available thermal noise voltage would be extremely small. To obtain a useful noise signal in so narrow a range of low frequencies by direct isolation from thermal noise would require extremely high amplification and extremely effective filtering, both of which involve relatively complex and expensive equipment.

The present invention overcomes those difficulties by providing an initial signal of an entirely different type, and by employing a particularly simple and effective procedure for isolating the desired frequency components from that initial signal.

In accordance with one aspect of the invention, thermal noise of elementary charges in a circuit is not amplified directly, but is caused to produce random variations in the manner in which a macroscopic system shifts between two discrete states. The system may, for example, comprise an oscillator of a type that shifts spontaneously and periodically between two relatively stable states. Many types of electronic oscillators are known, typically including an electronic tube that shifts periodically and relatively abruptly between conductive and non-conductive conditions. For example, circuit means may be provided that act while the tube is in either of its relatively stable conditions to apply a control voltage of progressively increasing amplitude tending to shift the tube to its other condition; and regenerative means in the tube itself or in the circuit may be provided tending to accelerate that shift once it is initiated. In such a system when the control voltage reaches a more or less well-defined critical level, the system shifts spontaneously and effectively instantaneously from one state to the other; and when the control voltage reaches another critical level the system shifts back to its first state. The actual values of the control voltage at which that shift occurs is not precisely uniform, due to random fluctuations of elementary charges in the circuit. It has been discovered that by suitable selection of the nature of the system and of the circuit components, the variation in the behavior of such an oscillator from one cycle to the next may be made relatively large and may be utilized to generate an initial signal from which a noise signal of the type described may be derived.

An initial output signal for the present purpose may be obtained from such an oscillator in various ways. For example, the control voltage itself may be coupled to an output circuit. The voltage in that output circuit then varies periodically, each cycle including typically a rise to one critical level, followed by a decline to a second critical level, both the rise and the decline varying in a random manner from one cycle to another, whether measured in terms of duration or in terms of the peak value attained. The resulting signal may be characterized as a periodic wave having an average fundamental frequency and an average amplitude, both the frequency and the amplitude being subject to random fluctuations. The signal may be considered to comprise a fundamental frequency that is amplitude and frequency modulated in a random manner, the nature of the modulation being expressible as a continuous spectrum of relatively low frequencies having randomly varying amplitude at each frequency.

In accordance with one aspect of the present invention, a signal of the type described is detected in any suitable manner, thereby eliminating the fundamental frequency; and the low frequency components are suitably amplified and filtered to produce the desired low frequency noise signal.

Convenient instrumentation of the invention requires that the described random modulation of the oscillator output be reasonably large compared to the amplitude of the fundamental frequency. It has been found that electronic oscillators utilizing a gas type tube are particularly suited for the present purpose. Not only does the tube itself provide the regenerative action required to produce sharply defined transition from one relatively stable condition to the other, but the action of such tubes is especially subject to random variation. It has further been discovered that the relative amplitude of the modulation increases sharply when the gas tube oscillator is so operated that the frequency is determined primarily by the behavior of the gas in the tube rather than by the constants of the external circuit. More specifically, the oscillator is preferably operated under such conditions that the ignition time and the extinction time of the gas in the tube are the primary factors, or at least are important factors, in determining the actual average frequency of operation. Under such conditions the amplitude of oscillation is relatively small and the degree of irregularity is sharply increased. That increased irregularity is partly relative, due to the decrease in absolute amplitude of the fundamental; but it appears to be greater than would be understandable on that basis, and to constitute an unexpected characteristic of a gas tube oscillator when driven at near its maximum frequency.

In accordance with another aspect of the invention, an initial signal of the general type just described is detected and amplified in a particularly effective manner. The initial signal is amplified progressively, as by successive stages of an amplifier; and the nature of the signal is progressively modified during the course of that amplification by relative attenuation of the amplitude of the fundamental (and preferably also of higher) frequencies with respect to the amplitude of the lower frequency components of the signal. That attenuation is typically such that the overall effect of amplification and attenuation is to progressively attenuate all frequencies higher than some critical frequency and to progressively amplify all frequencies lower than that critical frequency. The critical frequency, which is always lower than the fundamental, may be chosen relatively close to the fundamental or relatively far below it, the rate of attenuation with frequency being sufficient in either case to substantially eliminate the fundamental from the final output. For many purposes a rate of 6 decibels per octave, for example, is satisfactory, the critical frequency then being typically lower than the fundamental by at least about five to seven octaves.

A full understanding of the invention and of its further objects and advantages will be had from the following description of an illustrative embodiment, reference being had to the accompanying drawing. The particulars of that description, including the drawing, are intended as illustration and not as a limitation upon the scope of the invention, which is defined in the appended claims.

The figure is a schematic diagram of an illustrative low frequency noise generator in accordance with the invention.

In the typical embodiment of Fig. 1, tube V1 is a gas tube, shown illustratively as a tetrode with both grids tied to the cathode, and is connected as a relaxation oscillator with its cathode grounded and its plate connected through load resistors R1 and R2 to a suitable source 10 of positive potential, shown typically as 150 volts. Tube V1 may, for example, be a sub-miniature thyratron tetrode type 5643. Resistor R2 may be variable as shown, so that the total plate load may be variable, for example, from about 30,000 ohms to about 50,000 ohms. When the tube is non-conductive, current flows through the plate load to charge the effective plate capacitance of the tube, indicated at C0, increasing the effective plate potential until the tube fires. That capacitance then discharges rapidly through the tube until the plate voltage no longer can maintain ionization in the tube, which becomes again non-conductive. Taking the internal capacitance of the tube as of the order of 10 micromicrofarads and the plate impedance as 50,000 ohms, the RC time constant of the oscillator would correspond to a frequency of about 2 megacycles per second. Whereas an oscillator circuit of conventional design ordinarily oscillates at a frequency equal to or higher than the frequency corresponding directly to the time constant, the exact factor depending upon the detailed circuit design, the present preferred type of gas tube oscillator, with no external capacitance in the plate circuit and with relatively low plate impedance, actually oscillates at a frequency of the order of 200 kilocycles per second, which is appreciably less than the RC frequency. Operation of the oscillator in the preferred manner of the invention evidently means that the frequency of oscillation is relatively insensitive to constants of the external circuit, and is determined primarily by the time required for the gas in the tube to become ionized after breakdown has been initiated and the time required for the ions to disappear after current has been effectively cut off. That condition of oscillation is markedly different from that of a conventional relaxation oscillator, in which the ionization and extinction times are small compared to the period of oscillation, and the frequency is determined primarily by the constants of the external circuit.

A voltage wave is developed at the plate of tube V1 of rounded sawtooth form, and typically of approximately ten volts average amplitude. Because of the irregular frequency of operation of the oscillator, that amplitude is correspondingly irregular. The signal taken from the plate of V1 via coupling capacitor C1 therefore contains in effect a fundamental frequency which is both amplitude and frequency modulated in a manner that is substantially random. The signal also contains frequencies higher than the fundamental, since the primary voltage wave is typically not of symmetrical form. In accordance with the invention, the fundamental and the higher harmonics are removed from the signal, and the modulation frequencies are amplified and preferably also filtered to provide a noise signal having the desired bandwidth and occupying the desired frequency region. That involves primarily a detection function, which may utilize known techniques for detection of either amplitude modulated carrier waves or frequency modulated carrier waves, since both types of modulation are present.

In the preferred circuit of the figure, the output wave from oscillator tube V1 is amplified successively by tubes V2 and V3, the output from each stage of amplification being passed through a low-pass filter that sharply attenuates the signal at frequencies near or higher than the average fundamental frequency of the oscillator. As shown, the attenuating network for the output from V2 comprises the shunt capacitor C2 to ground, and that for the output from V3 is a half T section comprising series resistor R7 and shunting capacitor C4. The signal from filter network R7, C4 is coupled via capacitor C5 to a potentiometer R8 which provides convenient volume control. Further amplification of the resulting signal may be provided as required. For example, the signal from volume control R8 may be supplied to two independent amplifying channels V4 and V5, as illustrated, providing two substantially identical but mutually isolated noise signals. Tubes V4 and V5 have a common cathode resistor R10 which provides self bias, and their outputs are taken from the tube plates via coupling capacitors C6 and C7 to the output lines 12 and 14, respectively.

Each of the filter networks which immediately follow the first two amplifying stages V2 and V3 preferably provides an attenuation at the fundamental frequency that is considerably greater than the gain provided by the preceding amplifying stage, so that the resulting amplitude of the fundamental decreases progressively through the amplifier substantially to zero. The degree of attenuation in each filter network decreases with decreasing frequency, typically at a substantially uniform rate such as 6 decibels per octave. Hence at some determinable frequency less than the fundamental, the overall attenuation is less than the amplification, and at progressively lower frequencies the overall effect of the system is a progressively higher degree of amplification. The final output of the combined amplifying and attenuating network corresponds substantially to the envelope of the oscillation peaks of the original signal, or, more exactly, to the lower frequency portion of that envelope. It is not required, and ordinarily is not desirable, to use filter networks that selectively attenuate only the fundamental frequency, both because the oscillator output includes a relatively high harmonic content which needs to be removed, and because it is usually desirable to remove, or at least to attenuate, the higher frequency components of the envelope of the amplitude variations.

A low frequency cutoff may be provided if desired, and is inherent in the present illustrative system. The low frequency characteristic of the system as a whole is determined primarily by the time constants of the coupling circuits C3, R5 and C5, R8 between amplifier stages. Extension of the effective frequency range toward lower values may be obtained with larger values of those time constants or by a substitution of direct current coupling between amplifying stages.

Particularly when a triode is used for the first amplifying stage, as at V2, it is preferred that the following filter network be of such a type that its attenuation of the fundamental frequency be effective directly at the tube plate. That action results, for example, from direct connection of shunting capacitor C2 to the tube plate. By thus holding down the gain at the tube plate for frequencies near or higher than the fundamental, the plate of oscillator tube V1 is prevented from seeing the capacity that would otherwise result at V2 from the Miller effect. On the other hand, in the second amplifying stage V3, the resistance R7 is preferably inserted between the tube plate and shunting capacitor C4. The filtering action may thereby be made more effective, and any Miller effect capacitance at V3 has no effect upon the oscillator. The described action of tubes V2 and V3 and their associated filters will be seen to be equivalent to the function of detection or demodulation of a modulated carrier frequency; and the described system may be considered illustrative of the many known types of circuit that provide demodulation of an amplitude or frequency modulated carrier.

A system of the type described produces a final noise signal of readily controllable bandwidth and frequency region, the actual amplitude at each frequency varying in a substantially random manner. For example, if R7 is about 100,000 ohms, R5 and R8 are about 5 megohms each, C2 and C4 are about 0.5 microfarad each, and C3 and C5 are about 0.25 microfarad each, the output may comprise primarily frequencies between about one and about one-tenth cycle per second. The average amplitude of the output signal from the system shown may approximate 100 volts, and may, of course, be further amplified or otherwise modified by any conventional techniques.

I claim:

1. A system for generating a signal containing a continuous range of frequencies of substantially randomly varying amplitudes, said system comprising a gas tube having a plate and a cathode, circuit means connecting the gas tube as a relaxation oscillator, said circuit means comprising a plate circuit connected between the tube plate and the tube cathode and including a source of voltage, the impedance in the tube plate circuit and the capacitance effective between the plate and the cathode having a product that is less than the sum of the ignition time and the extinction time of gas in the tube, the tube oscillating between conditions of conduction and non-conduction at an oscillation frequency that is determined primarily by said ignition time and extinction time and that varies appreciably from one cycle to another in a substantially random manner, means acting to develop a signal corresponding to the oscillations and modulated in accordance with variations thereof, and means acting to demodulate the signal.

2. A system for generating a signal containing a continuous range of frequencies of substantially randomly varying amplitudes, said system comprising a gas tube that is capable of oscillating between conditions of conduction and non-conduction at a maximum frequency of approximately 200 kilocycles per second, circuit means connecting the gas tube as a relaxation oscillator, the RC time constant of said relaxation oscillator corresponding to a frequency appreciably greater than said maximum frequency, said relaxation oscillator operating at an average frequency that is substantially independent of said RC time constant and that is substantially equal to said maximum frequency of the tube, means acting to develop a signal corresponding to the oscillations of said oscillator and modulated in accordance with variations thereof, and means acting to attenuate the signal within the frequency range of the oscillations and to amplify the signal within a predetermined continuous range of frequencies that is predominantly lower than about 100 cycles per second.

3. A system for generating a signal containing a continuous range of frequencies of substantially randomly varying amplitudes, said system comprising a gas tube having a plate and a cathode, circuit means connecting the tube as a relaxation oscillator, said circuit means including a connection between the tube cathode and ground, and a connection including a plate impedance between the tube plate and a source of positive potential, said plate impedance and the capacitance effective between the plate and the cathode corresponding to a period of oscillation appreciably less than the sum of the ignition time and the extinction time of gas in the tube, the operating frequency of said oscillator being determined primarily by said ignition and extinction times and varying appreciably from one cycle to another in a substantially random manner, means acting to develop a signal corresponding to the oscillations and modulated in accordance with variations thereof, and means acting to attenuate the signal within the frequency range of the oscillations and to amplify the signal within a predetermined continuous range of frequencies that is appreciably lower than the average frequency of the oscillations.

4. A system for generating a signal containing a continuous range of frequencies of substantially randomly varying amplitudes, said system comprising a gas tube having a plate and a cathode, circuit means connecting the gas tube as a relaxation oscillator, said circuit means comprising a plate circuit connected between the tube plate and the tube cathode and including a source of voltage, the impedance in the tube plate circuit and the capacitance effective between the plate and the cathode having a product that is less than the sum of the ignition time and the extinction time of gas in the tube, the tube oscillating between conditions of conduction and non-conduction at an oscillation frequency that is determined primarily by said ignition time and extinction time and that varies appreciably from one cycle to another in a substantially random manner, amplifying means comprising a vacuum tube including a plate, a cathode, and a control grid, circuit means supplying a signal from the plate of the gas tube to the control grid of the vacuum tube, and a filter circuit comprising a capacitor shunting the vacuum tube and connected directly to the plate thereof, said filter circuit acting to reduce the effective gain of the vacuum tube at said oscillation frequency of the gas tube and thereby to reduce the Miller effect capacitance reflected into the plate circuit of the gas tube at said frequency.

5. A system for generating a signal containing a continuous range of frequencies of substantially randomly varying amplitudes, said system comprising a gas tube having a plate and a cathode, circuit means connecting the gas tube as a relaxation oscillator, said circuit means comprising a plate circuit connected between the tube plate and the tube cathode and including a source of voltage, the impedance in the tube plate circuit and the capacitance effective between the plate and the cathode having a product that corresponds to a period of oscillation less than the sum of the ignition time and the extinction time of gas in the tube, the tube oscillating between conditions of conduction and non-conduction at an oscillation frequency that is determined primarily by said ignition time and extinction time and that varies appreciably from one cycle to another in a substantially random manner, means acting to develop a signal corresponding to the oscillations and modulated in accordance with variations thereof, and means acting to demodulate the signal.

References Cited in the file of this patent

UNITED STATES PATENTS

| | | |
|---|---|---|
| 2,416,307 | Grieg | Feb. 25, 1947 |
| 2,607,897 | Fairbairn | Aug. 19, 1952 |
| 2,614,154 | Dionne | Oct. 14, 1952 |
| 2,686,876 | Mills | Aug. 17, 1954 |

OTHER REFERENCES

Perpetual Trouble Shooter's Manual by John F. Rider, pages 13–72, Truetone.